(12) United States Patent
Ataka

(10) Patent No.: US 11,459,191 B2
(45) Date of Patent: Oct. 4, 2022

(54) AUTOMATED FIBER BUNDLE PLACEMENT APPARATUS

(71) Applicant: TSUDAKOMA KOGYO KABUSHIKI KAISHA, Ishikawa-ken (JP)

(72) Inventor: Takeshi Ataka, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 0 days.

(21) Appl. No.: 17/162,940

(22) Filed: Jan. 29, 2021

(65) Prior Publication Data

US 2021/0269256 A1    Sep. 2, 2021

(30) Foreign Application Priority Data

Feb. 28, 2020   (JP) .............................. JP2020-032731
Sep. 25, 2020   (JP) .............................. JP2020-160322

(51) Int. Cl.
  *B29C 70/38*     (2006.01)
  *B65G 47/90*     (2006.01)
  *B29C 53/80*     (2006.01)

(52) U.S. Cl.
  CPC .......... *B65G 47/90* (2013.01); *B29C 53/8016* (2013.01); *B29C 70/384* (2013.01)

(58) Field of Classification Search
  None
  See application file for complete search history.

(56) References Cited

U.S. PATENT DOCUMENTS

| 6,112,792 | A | 9/2000 | Barr et al. |
| 2014/0060742 | A1 | 3/2014 | Hamlyn |
| 2016/0325508 | A1 | 11/2016 | Hamlyn |

FOREIGN PATENT DOCUMENTS

| JP | 2014-511781 A | 5/2014 |
| JP | 2019-130914 A | 8/2019 |
| WO | WO 2015/075079 A2 | 5/2015 |

OTHER PUBLICATIONS

Jul. 13, 2021, European Search Report issued for related EP application No. 21154352.5.

*Primary Examiner* — Ronald P Jarrett
(74) *Attorney, Agent, or Firm* — Paratus Law Group, PLLC

(57) ABSTRACT

An automated fiber bundle placement apparatus includes a supply device, a placement head, and an articulated robot. The articulated robot includes a head swing mechanism and a guide mechanism. The guide mechanism includes a position changing mechanism which includes a support member for supporting a tow guide, and which displaces the tow guide corresponding to a change in a position of an introduction section by a head swing mechanism.

3 Claims, 4 Drawing Sheets

AUTOMATED FIBER BUNDLE PLACEMENT APPARATUS

CROSS-REFERENCE TO RELATED APPLICATIONS

The present application claims priority from Japanese Patent Applications No. 2020-032731, filed on Feb. 28, 2020, and No. 2020-160322, filed on Sep. 25, 2020, the entire subject matter of them are incorporated herein by reference.

BACKGROUND OF THE INVENTION

Field of the Invention

According to the present invention, there is provided an automated fiber bundle placement apparatus including a supply device configured to set a plurality of bobbins around which fiber bundles are wound, and deliver the fiber bundles from each of the bobbins, a placement head that includes an introduction section for introducing each of the fiber bundles supplied from the supply device, and performs placement of each of the introduced fiber bundles on a placement die, and an articulated robot which has an arm to which the placement head is attached and moves the placement head for the placement, in which the articulated robot includes a head swing mechanism that changes a position of the introduction section with respect to an extremity of the arm, and a guide mechanism having a plurality of tow guides provided corresponding to each of the fiber bundles for guiding the fiber bundles from the supply device toward the placement head.

Background Art

As an automated fiber bundle placement apparatus, an automated fiber placement (AFP) apparatus that places a narrow fiber bundle on a placement die is known. In the present application, the "fiber bundle" refers to a material such as a so-called tow prepreg formed in a tape shape by impregnating a bundle of a plurality of reinforcing fibers (carbon fibers, glass fibers, and the like) with a matrix resin. As the AFP apparatus, there is an apparatus configured to perform placement of the fiber bundle on the placement die by using an articulated robot.

As such an AFP apparatus, JP-A-2019-130914 discloses an apparatus including an unwinding mechanism configured to unwind (deliver) a fiber bundle from a bobbin around which the fiber bundle is wound, an attachment head as a placement head for performing the placement, and an articulated robot having an arm to which the attachment head (placement head) is attached. As a technology of the related art, JP-A-2019-130914 discloses an apparatus configured to guide the fiber bundle delivered from the unwinding mechanism provided separately from the articulated robot to the placement head in a form of passing above the articulated robot (arm). In addition, as a configuration for guiding the fiber bundle as described above (although there is no specific description in JP-A-2019-130914), the AFP apparatus (articulated robot) includes a guide mechanism provided in a form of being attached to the arm of the articulated robot.

As the AFP apparatus, JP-T-2014-511781 also discloses an apparatus configured to include a displacement system as an articulated robot, and a fiber attachment head which is a placement head and is attached to an end of the articulated robot, and perform the placement of a wide band (fiber bundle) made of flat fibers impregnated with resin by the fiber attachment head (placement head). JP-T-2014-511781 discloses that the AFP apparatus includes a creel (supply device) as a fiber storage unit provided separately from the articulated robot, a plurality of spools (bobbins) around which the fiber bundle is wound are set with respect to the creel, and a plurality of fiber bundles are supplied toward the placement head. In addition, the AFP apparatus of JP-T-2014-511781 is configured to include a flexible pin that connects the supply device and the placement head to each other, and guide the fiber bundle in a form of passing through the flexible pin.

SUMMARY OF THE INVENTION

Incidentally, in the AFP apparatus as described above, in the placement, in a case of moving the placement head by the articulated robot and placing the fiber bundle on the placement die having a complicated shape, there is a case where an operation (swing operation of the placement head) of swinging the placement head, such as rotation of the arm to which the placement head is attached or rotation of the placement head with respect to the arm in the articulated robot, is performed. The fiber bundle supplied to the placement head is introduced into the placement head via the introduction section in the placement head, but as the swing operation of the placement head is performed as described above, the position of the introduction section changes relative to the extremity of the arm.

However, in the AFP apparatus of JP-A-2019-130914, the fiber bundle is guided by the guide mechanism attached to the arm of the articulated robot on the upstream side thereof. The position for guiding the fiber bundle by the guide mechanism is a position that is relatively fixed to the arm. Therefore, when the swing operation of the placement head is performed and the position of the introduction section is changed as described above, the path length of the fiber bundle suddenly changes between the guide mechanism and the introduction section, and there is a concern that this adversely affects the placement. Furthermore, as the introduction section is displaced on the placement head as described above, there is a case where the fiber bundle interferes with the arm or the like and is damaged. Therefore, the AFP apparatus that guides the fiber bundle by the guide configuration using the guide mechanism as in JP-A-2019-130914 has a problem that the operation of the placement head is restricted, that is, it is not possible to correspond to the placement die having a complicated shape.

Furthermore, in the AFP apparatus configured such that the placement head disclosed in JP-T-2014-511781 performs the placement of the plurality of fiber bundles, in a case where the guide configuration as in JP-A-2019-130914 is adopted, the plurality of fiber bundles are supplied (introduced) to the placement head, and thus, the above-described problem is more likely to occur.

In the AFP apparatus of JP-T-2014-511781, as described above, the fiber bundle is guided in a form of passing through the flexible pin that connects the supply device and the placement head to each other. Therefore, in a case of performing the placement, even when the placement head is made to perform a complicated operation, the above-described problem is unlikely to occur. However, in such an apparatus that guides the plurality of fiber bundles with the guide configuration using the flexible pin, the flexible pins are provided for each fiber bundle, and thus, the guide configuration becomes complicated. In a case of the configuration, since the inside of the flexible pin becomes dirty or clogged due to the passage of the fiber bundle as described above, it is necessary to regularly perform maintenance work in the flexible pin. The maintenance work described above has to be performed individually for each flexible pin provided for each fiber bundle, and thus, there is a problem that a lot of effort and time are required.

In view of the above circumstances, an object of the present invention is to provide a configuration of a guide mechanism which does not cause the above-described problem after placing a plurality of fiber bundles on a placement die in an automated fiber bundle placement apparatus including the guide mechanism that guides the plurality of fiber bundles from a supply device toward the placement head.

The present invention presupposes an automated fiber bundle placement apparatus including a supply device configured to set a plurality of bobbins around which fiber bundles are wound, and deliver the fiber bundles from each of the bobbins, a placement head that includes an introduction section for introducing each of the fiber bundles supplied from the supply device, and performs placement of each of the introduced fiber bundles on a placement die, and an articulated robot which has an arm to which the placement head is attached and moves the placement head for the placement, in which the articulated robot includes a head swing mechanism that changes a position of the introduction section with respect to an extremity of the arm, and a guide mechanism having a plurality of tow guides provided corresponding to each of the fiber bundles for guiding the fiber bundles from the supply device toward the placement head.

In the automated fiber bundle placement apparatus that is the presupposition of the present invention, the guide mechanism includes a position changing mechanism which includes a support member for supporting the tow guide, and which displaces the tow guide in response to the change in the position of the introduction section by the head swing mechanism.

However, the "head swing mechanism" referred to here is a mechanism that makes an operation of swinging the placement head on the extremity side of the arm, such as a mechanism for rotating the arm in the articulated robot around the center axial line, a mechanism that is interposed between the arm and the placement head in a state where the placement head is supported at the extremity of the arm and rotates the placement head around the axial line of the support, or a mechanism that is interposed between the arm and the placement head similarly and makes the placement head oscillate in the extending direction of the arm. When the placement head performs the swing operation as described above, the introduction section of the fiber bundle in the placement head is displaced such that the position is changed with respect to the extremity of the arm.

In the automated fiber bundle placement apparatus according to the present invention, the position changing mechanism may include a displacement mechanism that displaces at least a part of the support member that supports the tow guide by using an actuator as a driving source. Furthermore, the displacement mechanism may be a longitudinal oscillation mechanism that oscillates the support member in the extending direction of the arm.

In the automated fiber bundle placement apparatus according to the invention, the guide mechanism includes the position changing mechanism for displacing the tow guide supported by the support member in response to the change in the position of the introduction section by the head swing mechanism. Accordingly, even when the displacement of the introduction section is performed as described above, the change in the path length of the fiber bundle can be reduced.

More specifically, in the automated fiber bundle placement apparatus according to the invention, the guide mechanism is configured such that the tow guide is displaced via the above-described position changing mechanism. According to the configuration of such a guide mechanism, even when the position of the introduction section changes with respect to the extremity of the arm as the placement head swings by the swing mechanism, the tow guide is displaced by the position changing mechanism, and accordingly, the change in the path length of the fiber bundle from the tow guide to the introduction section can be reduced. Accordingly, the adverse effect on the placement due to the change in the path length is eliminated as much as possible.

Moreover, according to such a guide mechanism, as the tow guide is displaced as the introduction section is displaced, the fiber bundle is less likely to interfere with the arm or the like of the articulated robot. Therefore, according to the configuration, it is possible to cause the placement head to perform the swing operation such as rotation without providing a flexible pin for guiding the fiber bundle as in the technology of the related art.

As described above, according to the automated fiber bundle placement apparatus of the invention, it is possible to stably perform the placement even for a placement die having a complicated shape, and further, a configuration in which the guide configuration of the fiber bundle is complicated and a lot of effort are required for the maintenance work can also be avoided.

The above-described position changing mechanism includes the displacement mechanism that uses an actuator as a driving source, a part of the support member that supports the tow guide is actively displaced, and accordingly, the displacement of the part that corresponds to the swing operation of the placement head can be performed more reliably. Accordingly, the above-described effect is more reliably achieved.

Furthermore, the displacement mechanism in the position changing mechanism is the longitudinal oscillation mechanism configured such that the support member actively oscillates in the extending direction of the arm, and accordingly, the displacement mechanism can have a relatively simple configuration. Specifically, as a configuration for displacing the tow guide as described above, it is also considered to configure the displacement mechanism such that the part of the support member that supports the tow guide is displaced linearly. On the other hand, when the displacement mechanism is configured to oscillate the support member as described above, the displacement mechanism can have a relatively simple configuration as compared with the displacement mechanism configured to linearly displace the tow guide. Therefore, since the guide configuration for displacing the tow guide in this manner can be realized with a relatively simple configuration, it is possible to avoid complicating the configuration of the automated fiber bundle placement apparatus.

DETAILED DESCRIPTION OF THE INVENTION

Hereinafter, an embodiment of an automated fiber bundle placement apparatus according to the invention will be described with reference to FIGS. 1 to 4.

Figure 1:
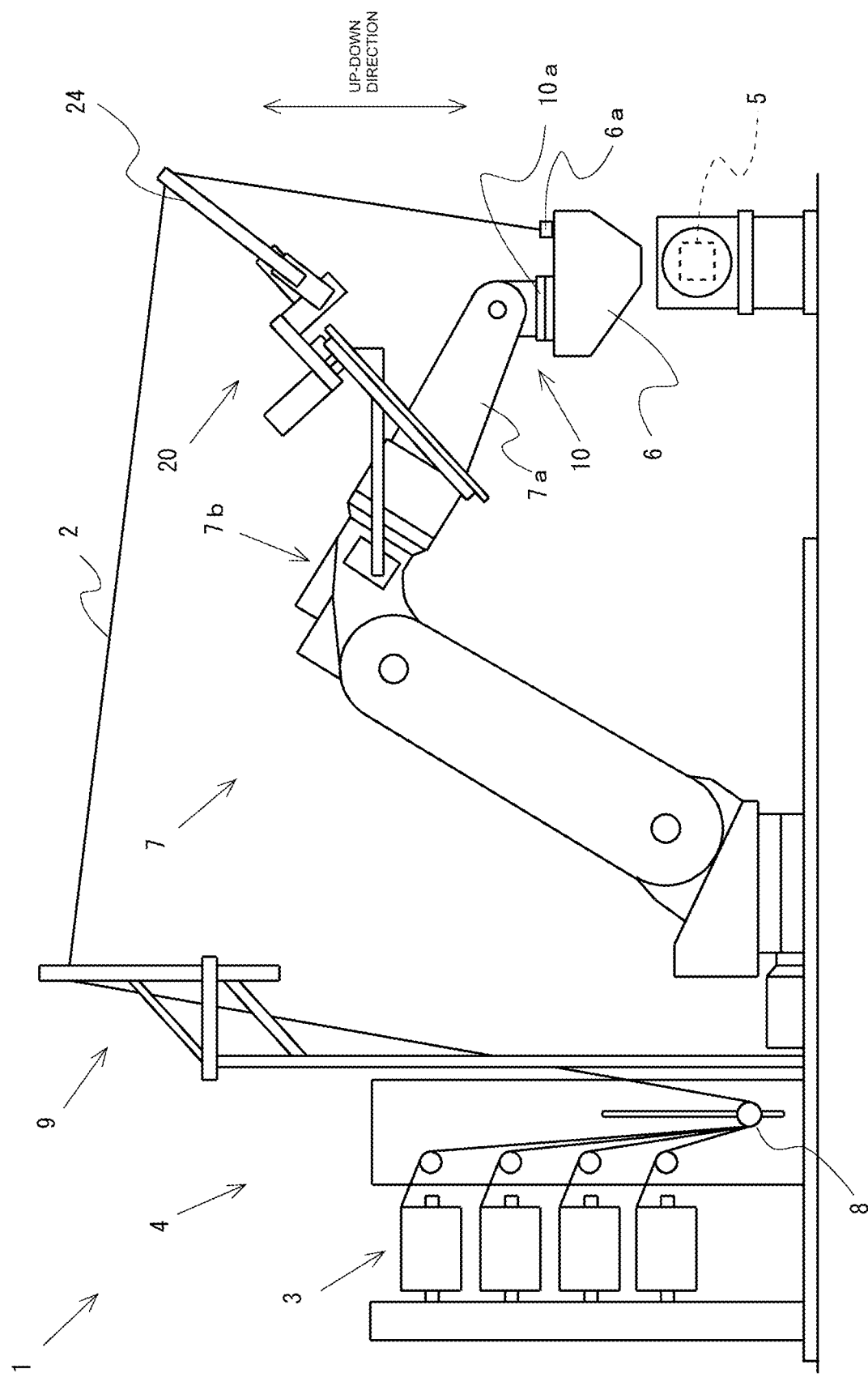
FIG. 1 is a side elevation illustrating an example of an automated fiber bundle placement apparatus according to the invention.

As illustrated in FIG. 1, an automated fiber bundle placement apparatus 1 includes: a supply device 4 configured to set bobbins 3 around which fiber bundles 2 are wound; a placement head 6 for performing placement of the fiber bundles 2 supplied from the supply device 4 on a placement die 5; and an articulated robot 7 which moves the placement head 6 for the placement. In the embodiment, the automated fiber bundle placement apparatus 1 is configured such that the placement of sixteen fiber bundles 2 is performed at the same time. Therefore, although only four on the front side are illustrated in the drawing, but sixteen bobbins 3 are set in the supply device 4.

The supply device 4 includes a guide section 9 that guides the fiber bundle 2 pulled out from each bobbin 3 toward the articulated robot 7. The guide section 9 is configured to include a guide member (not illustrated) provided for each fiber bundle 2 for guiding each fiber bundle 2 individually, and to guide each fiber bundle 2 to a position higher than the articulated robot 7 by the guide member. In the supply device 4, a dancer roll 8 common to each fiber bundle 2 is provided as a configuration for adjusting the tension of each fiber bundle 2 in the path of the fiber bundle 2 between each bobbin 3 and the guide section 9. According to the configuration, each fiber bundle 2 is adjusted to an appropriate tension between the bobbin 3 and the guide section 9, and is pulled out to the articulated robot 7 side in an appropriate tension state.

As illustrated in FIG. 1, as described above, a guide mechanism 20 for guiding each fiber bundle 2 guided by the guide section 9 is attached to the articulated robot 7. The guide mechanism 20 is attached to an arm 7a (a part on the extremity side of a joint portion 7b) on the extremity side of the articulated robot 7. The guide mechanism 20 includes tow guides provided for each fiber bundle 2 for guiding each fiber bundle 2 individually, and is configured such that each tow guide is supported by the support member 24. The guide mechanism 20 is provided such that the support member 24 extends upward above the arm 7a and guides each fiber bundle 2 on the extremity side of the support member 24.

Therefore, in the automated fiber bundle placement apparatus 1, after the fiber bundle 2 pulled out from each bobbin 3 is pulled out from the supply device 4 (guide section 9) at a position higher than that of the articulated robot 7 in the up-down direction, the fiber bundle 2 reaches the guide mechanism 20 in a form of passing above the articulated robot 7. Each fiber bundle 2 is turned in a form of being guided by the guide mechanism 20, and is guided to the placement head 6 attached to the extremity of the arm 7a in the articulated robot 7.

Each of the fiber bundles 2 guided toward the placement head 6 in this manner is introduced into the placement head 6 and placed on the placement die 5. Therefore, the placement head 6 has an introduction section 6a for introducing each fiber bundle 2 into the inside thereof in a form of being provided for each fiber bundle 2.

In the embodiment, the placement head 6 is attached to the arm 7a of the articulated robot 7 via a rotation mechanism 10 which is the head swing mechanism referred to in the invention. The rotation mechanism 10 has a rotation section 10a that is rotationally driven, and the placement head 6 is attached to the rotation section 10a. Accordingly, the placement head 6 is provided to be swingably driven by the rotation mechanism 10 on the extremity side of the articulated robot 7.

In the automated fiber bundle placement apparatus 1 configured as described above, the guide mechanism 20 includes the support member 24 that supports the tow guide and the support mechanism that supports the support member 24, and is configured such that the support mechanism can displace the support member 24 in the width direction of the automated fiber bundle placement apparatus 1. In the embodiment, the support mechanism is configured to include a drive mechanism for actively displacing the support member 24, that is, a drive mechanism using a driving motor as a driving source. In addition, the guide mechanism 20 of the embodiment includes the longitudinal oscillation mechanism as a displacement mechanism in the invention, and the support member 24 is supported by the guide mechanism 20 in the longitudinal oscillation mechanism. The configuration of the guide mechanism 20 will be described in detail below with reference to FIGS. 2 to 4.

As described above, the automated fiber bundle placement apparatus 1 of the embodiment is configured to be capable of placing sixteen fiber bundles 2. Here, the automated fiber bundle placement apparatus 1 includes sixteen tow guides 22 that correspond to each fiber bundle 2. In the embodiment, each tow guide 22 is configured with a hollow cylindrical member having a collar portion. In addition, the sixteen tow guides 22 are supported by the support member 24.

The support member 24 is mainly configured with a pair of side plates 24a and 24a. Regarding the support member 24, more specifically, each side plate 24a is a plate-shaped member and is formed to have a rectangular shape in which the dimension in the long side direction is sufficiently larger than the dimension in the short side direction when viewed in the plate thickness direction. In the support member 24, the pair of side plates 24a and 24a are provided such that the plate surfaces are separated from each other in a form of facing each other.

Furthermore, the support member 24 has spindles 24b provided in a form of being erected on both side plates 24a and 24a. In other words, the pair of side plates 24a and 24a are connected to each other by the spindles 24b. The spindles 24b are shafts for supporting the tow guides 22, and four spindles 24b are provided on one end side of the side plate 24a in the long side direction (=longitudinal direction of the side plate 24a). The sixteen tow guides 22 are provided in a form that the tow guides 22 are supported by each spindle 24b four by four. The support of the tow guide 22 is performed by the spindle 24b in a form that the spindle 24b is inserted into the hole of the hollow cylindrical tow guide 22, and each tow guide 22 can rotate with respect to the spindle 24b.

Incidentally, in the illustrated example, the support member 24 also includes a reinforcing member 24c that connects both the side plates 24a and 24a to each other. The reinforcing member 24c connects both the side plates 24a and 24a to each other in a form of being erected in the vicinity of the intermediate portion in the longitudinal direction of the side plate 24a.

In addition, the support member 24 is supported by a support mechanism 26 attached to the arm 7a of the articulated robot 7. However, the guide mechanism 20 (support mechanism 26) of the embodiment has a longitudinal oscillation mechanism 50 (details will be described later) that oscillates the support member 24 in the extending direction of the arm 7a. The support member 24 is supported by the support mechanism 26 via the longitudinal oscillation mechanism 50. Here, the support member 24 is attached to the longitudinal oscillation mechanism 50 in a form that the longitudinal oscillation mechanism 50 is positioned between both the side plates 24a and 24a on the other end side of the side plate 24a in the longitudinal direction.

Regarding the support mechanism 26 that supports the support member 24 in this manner, in the embodiment, the support mechanism 26 supports the support member 24, and includes a drive mechanism 30 that actively displaces the support member 24 using the driving motor 31 as a driving source, and a guide support structure 40 that supports the drive mechanism 30 with respect to the arm 7a. The drive mechanism 30 includes a rail member 32 supported with respect to the arm 7a via the guide support structure 40, a movable member 33 which is displaced on the rail member 32 and to which the support member 24 is attached, and a driving unit 34 for displacing the movable member 33 on the rail member 32.

More specifically, with respect to each component of the drive mechanism 30, the rail member 32 is mainly configured with a plate-shaped base portion 32a as a base. However, the base portion 32a is formed in an arc shape of approximately ⅔ of a circle when viewed in the plate thickness direction. The inner diameter of the base portion 32a is formed to have a size that the arm 7a of the articulated robot 7 can be placed inside the base portion 32a.

The rail member 32 has a guide rail 32b for guiding the displacement of the movable member 33, and a rack 32c that functions as a part of the driving unit 34. Among them, the guide rail 32b is a rail-shaped part having a substantially rectangular cross-sectional shape and provided to extend on the front surface which is one end surface in the plate thickness direction in the base portion 32a. However, the guide rail 32b is formed in an arc shape to extend along the peripheral edge of the base portion 32a. The guide rail 32b is positioned on the outer peripheral edge side of the base portion 32a on the front surface, and is provided to extend over a range in the arc direction of the base portion 32a.

The rack 32c is a so-called rack in which teeth engaged with the pinion are formed, and is provided to extend on the front surface of the base portion 32a similar to the guide rail 32b. Similar to the guide rail 32b, the rack 32c is also formed in an arc shape to extend along the peripheral edge of the base portion 32a. However, the rack 32c is formed such that the teeth face the inside of the arc. The rack 32c is positioned to be separated from the guide rail 32b on the inner peripheral edge side of the base portion 32a on the front surface, and is provided to extend over a range in the arc direction of the base portion 32a.

The movable member 33 is configured with a support 33a which is the main body of the movable member 33 and supports the support member 24, and an engaging member 33b engaged with the guide rail 32b of the rail member 32 that is supposed to guide the displacement of the support 33a on the rail member 32. The driving unit 34 for displacing the support 33a (movable member 33) in this manner uses the driving motor 31 as a driving source as described above, and the driving motor 31 is supported by the support 33a. The details of these configurations are as follows.

The support 33a is a plate-shaped member, and is a member having a rectangular shape when viewed in the plate thickness direction (both plate surfaces in the plate thickness direction form a rectangular shape). However, the support 33a is formed such that the dimension in the long side direction of both the plate surfaces thereof is a dimension (a dimension approximately twice the distance) sufficiently larger than the distance between the guide rail 32b and the rack 32c in the rail member 32.

The engaging member 33b is a block-shaped member formed in a thick plate shape. The engaging member 33b is attached to the support 33a in an orientation in which the thickness direction matches the plate thickness direction of the support 33a, and one of both end surfaces in the thickness direction is an attachment surface.

The engaging member 33b has a guide groove 33b1 formed to be open to the other end surface of the both end surfaces and also to be open to the surfaces on both sides in the long side direction of the other end surface. However, the guide groove 33b1 is formed to make an arc with the same curvature as that of the guide rail 32b in the rail member 32. The guide groove 33b1 is formed to have a size such that the guide rail 32b can be engaged with the guide groove 33b1. In other words, the guide groove 33b1 is formed to have a size such that the groove width substantially matches (slightly large) the width of the guide rail 32b. The depth dimension of the guide groove 33b1 is smaller than the height dimension of the guide rail 32b, and is approximately half in the illustrated example.

In addition, the engaging member 33b is attached to one of both the plate surfaces of the support 33a by a screw member or the like in a state of abutting against the attachment surface. However, regarding the attachment, the attachment is performed in a state where the engaging member 33b is positioned in the vicinity of the intermediate portion in the long side direction (=the long side direction of the support 33a) of the plate surface of the support 33a, and the long side direction of the attachment surface of the engaging member 33b matches the short side direction of the plate surface of the support 33a.

The driving unit 34 is configured with the driving motor 31 which is a driving source, a pinion 31a attached to an output shaft of the driving motor 31, and the rack 32c engaged with the pinion 31a. In other words, the rack 32c provided on the rail member 32 also functions as a part of the driving unit 34.

In the driving unit 34, the driving motor 31 is provided in a form of being supported by the support 33a as described above, and is attached to the other one of both the plate surfaces of the support 33a by a screw member or the like. The attachment is performed in a form of making the axial direction of the output shaft of the driving motor 31 match the plate thickness direction of the support 33a. Here, the support 33a is formed with a through hole that allows the output shaft to pass through the part corresponding to the output shaft at the position where the driving motor 31 is attached. However, the attachment position is set to a position on the inner peripheral side of the arc-shaped guide groove 33b1 in the engaging member 33b with respect to the long side direction of the support 33a in the positional relationship with the engaging member 33b which is also attached to the support 33a, that is, a position where the distance between the output shaft of the driving motor 31 and the guide groove 33b1 of the engaging member 33b is substantially the same as the distance between the guide rail 32b and the rack 32c in the rail member 32.

In addition, in a state where the driving motor 31 is attached to the support 33a as described above, the output shaft of the driving motor 31 penetrates the support 33a, and is in a state where the extremity portion thereof is positioned on the one plate surface of the support 33a. In addition, the pinion 31a is attached to the extremity portion of the output shaft. As described above, the pinion 31a is engaged with the rack 32c of the rail member 32. Therefore, the attachment position of the driving motor 31 with respect to the support 33a is a position where the pinion 31a attached to the driving motor 31 is engaged with the rack 32c in a state where the engaging member 33b attached to the support 33a is engaged with the guide rail 32b of the rail member 32.

The drive mechanism 30 provided with each component is configured such that the movable member 33 and the rail member 32 are combined with each other in a form of engaging the engaging member 33b in the movable member 33 with the guide rail 32b in the rail member 32 in the guide groove 33b1. In a state where the engaging member 33b and the guide rail 32b are engaged with each other in this manner, since the driving motor 31 in the driving unit 34 is attached to the support 33a at the above-described position, and the driving motor 31 is in a state of being positioned on the rack 32c side of the guide rail 32b with respect to the rail member 32. In this state, the drive mechanism 30 is in a state where the pinion 31a attached to the driving motor 31 and the rack 32c of the rail member 32 is engaged with each other.

In addition, the drive mechanism 30 is supported by the arm 7a of the articulated robot 7 via the guide support structure 40 as described above. The guide support structure 40 is configured to support the drive mechanism 30 by a pair of support bars 40a and 40a. Each of the support bars 40a is a prismatic member in the embodiment.

The guide support structure 40 includes a pair of attachment sections 40b and 40b which are attachment sections 40b for attaching each support bar 40a to the arm 7a, and are attached to the arm 7a. Each attachment section 40b is attached to the back end portion of the arm 7a on the side opposite to the extremity portion to which the placement head 6 is attached. The pair of attachment sections 40b and 40b are provided in a form of extending from both side portions of the arm 7a toward both sides of the arm 7a. Each of the support bars 40a is attached (supported) to the attachment section 40b at one end portion thereof in a form of extending from the back end portion of the arm 7a to which the attachment section 40b is attached toward the extremity side of the arm 7a. In a state where each support bar 40a is attached in this manner, the other end portion is positioned above the arm 7a, and is provided in a form that the extending direction of the arm 7a makes an angle approximately 30° with respect to the extending direction of the arm 7a when viewed from the side.

In the illustrated example, the guide support structure 40 includes a reinforcing member 40d that connects both support bars 40a and 40a to each other. The reinforcing member 40d connects both the support bars 40a and 40a to each other in a form of being erected in the vicinity of the other end portion of the support bar 40a.

Furthermore, the guide support structure 40 includes a pair of support sections 40c and 40c that are support sections 40c provided at the other end portion of each support bar 40a, and are in a state where the drive mechanism 30 (rail member 32) is attached to each support bar 40a and the drive mechanism 30 is supported by both the support bars 40a and 40a.

Each of the support sections 40c is configured in a form that two plate-shaped portions 40c1 and 40c1 made of a plate material face each other Each of the plate-shaped portions 40c1 is formed in a substantially L shape having a rectangular part attached to the support bar 40a and a triangular part formed to extend from one side edge of the rectangular part in the short side direction. The triangular part is formed such that the inclined side edge is formed to make an obtuse angle with respect to the one side edge of the rectangular part, and the angle is approximately 140° in the illustrated example. Furthermore, although not illustrated, each of the plate-shaped portions 40c1 has a plate surface that extends in the plate thickness direction from the inclined side edge at the triangular part.

In addition, the two plate-shaped portions 40c1 and 40c1 that configure the support section 40c are attached to the side surface of the corresponding support bar 40a while the plate surfaces are oriented facing the support bar 40a on the end surface of the rectangular part. Therefore, in a state where each plate-shaped portion 40c1 is attached in this manner, the two plate surfaces face the support bar 40a and are in a form of existing while making an angle of approximately 140° with respect to the extending direction of the support bar 40a. The two plate surfaces serve as surfaces (attachment surfaces) to which the drive mechanism 30 (rail member 32) is attached in the support section 40c.

The drive mechanism 30 is attached to the guide support structure 40 in a state where the back surface (the end surface on the side opposite to the side on which the guide rail 32b or the like is provided) of the base portion 32a in the rail member 32 abuts against the attachment surface in each of the support sections 40c. The attachment is performed in a state where the guide support structure 40 is oriented such that both the support bars 40a and 40a (arms 7a) are positioned inside the base portion 32a, and the center of the base portion 32a matches the center of the arm 7a in a plan. In a state where the attachment is performed in this manner, the drive mechanism 30 is in a state where the base portion 32a makes the angle of approximately 70° with respect to the extending direction of the arm 7a and extends above from the position of the arm 7a when the arm 7a is viewed from side.

The drive mechanism 30 (support mechanism 26) includes the longitudinal oscillation mechanism 50 that oscillates the support member 24 in the extending direction of the arm 7a as described above. In addition, the support member 24 is supported with respect to the drive mechanism 30 in the longitudinal oscillation mechanism 50. The longitudinal oscillation mechanism 50 includes an oscillation drive mechanism 51 for oscillating the support member 24 using a driving motor 51a which is an actuator as a driving source, and a pair of oscillating arms 52 and 52 that connect the oscillation drive mechanism 51 and the support member 24 to each other. The combination of the longitudinal oscillation mechanism 50 and the support member 24 configured in this manner corresponds to the position changing mechanism referred to in the invention.

Regarding the longitudinal oscillation mechanism 50, more specifically, the oscillation drive mechanism 51 is based on a substantially rectangular parallelepiped support housing 51b, and is attached to the support 33a in the movable member 33 in the support housing 51b. The attachment of the support housing 51b to the support 33a is performed in a form of being attached to the one plate surface (plate surface on a side to which the engaging member 33b is attached) in the support 33a on the side opposite to the driving motor 31 side with respect to the engaging member 33b in the long side direction of the support 33a. The support housing 51b is attached to the support 33a while the end surface thereof abuts against the support 33a and two of the four side surfaces orthogonal to the end surface that abuts against the support 33a are parallel to the long side direction of the support 33a.

In addition, the driving motor 51a is attached to the side surface orthogonal to the long side direction of the support 33a, that is, the side surface on the side far from the engaging member 33b, among the side surfaces in the support housing 51b, with a screw member or the like. In other words, in the support housing 51b, the side surface thereof is a motor attachment surface. The driving motor 51a is attached to the support housing 51b in a state where the output shaft matches the long side direction of the support 33a and the output shaft penetrates the side wall including the motor attachment surface of the support housing 51b.

The oscillation drive mechanism 51 includes an oscillation shaft 51c provided on the support housing 51b while being parallel to the motor attachment surface of the support housing 51b. With respect to two side surfaces (lateral side surfaces) the support housing 51b parallel to the long side direction of the support 33a, the oscillation shaft 51c is provided in a form of penetrating the side walls including each of the lateral side surfaces of the support housing 51b and being supported by both side walls. In other words, the oscillation shaft 51c is supported by the support housing 51b, and both end portions thereof are provided in the oscillation drive mechanism 51 in a form of protruding from the lateral side surface of the support housing 51b.

In addition, in the oscillation drive mechanism 51, the output shaft of the driving motor 51a and the oscillation shaft 51c are connected to each other on the inside of the support housing 51b by using a gear mechanism (not illustrated). Since the output shaft of the driving motor 51a and the oscillation shaft 51c are orthogonal to each other in the axial direction, the gear mechanism thereof uses a bevel gear or the like. With such a configuration, in the oscillation drive mechanism 51, the oscillation shaft 51c is driven to oscillate as the driving motor 51a is driven in forward and reverse directions.

Each of the oscillating arms 52 is a thick plate-shaped member, and is a member formed in a rectangular shape when viewed in the plate thickness direction. Each of the oscillating arms 52 has a split collar mechanism formed at one end portion in the longitudinal direction thereof. The pair of oscillating arms 52 and 52 are attached to both end portions of the oscillation shaft 51c in the oscillation drive mechanism 51 by each of split collar mechanisms not to be relatively rotatable by split collar fixing. The attachment of each oscillating arm 52 to the oscillation shaft 51c is performed in a form that the phases of both the oscillating arms 52 and 52 with respect to the oscillation shaft 51c match each other, and each of the oscillating arms 52 extends from the position of the oscillation shaft 51c toward the driving motor 51a side.

The support member 24 is supported by the longitudinal oscillation mechanism 50 in the drive mechanism 30 in a form of being attached to the pair of oscillating arms 52 and 52. The attachment of the support member 24 to the oscillating arm 52 is performed in a form that the pair of side plates 24a and 24a of the support member 24 are attached at the part of each of the other end portions in the longitudinal direction of the side plate 24a in a state where the longitudinal direction of the side plates 24a matches the extending direction of the oscillating arm 52. Therefore, the support member 24 is in a state of being supported by the longitudinal oscillation mechanism 50 in a form that the side plate 24a extends from the longitudinal oscillation mechanism 50 (oscillation shaft 51c) in the extending direction.

In addition, the longitudinal oscillation mechanism 50 is included in the drive mechanism 30 of the support mechanism 26 as described above, and is supported at the support 33a of the movable member 33 with respect to the movable member 33 provided on the rail member 32 in the drive mechanism 30. Since the drive mechanism 30 is supported by the arm 7a of the articulated robot 7 by the guide support structure 40, the support member 24 is in a state of being supported by the arm 7a by the support mechanism 26 including the guide support structure 40 and the drive mechanism 30.

Figure 2:
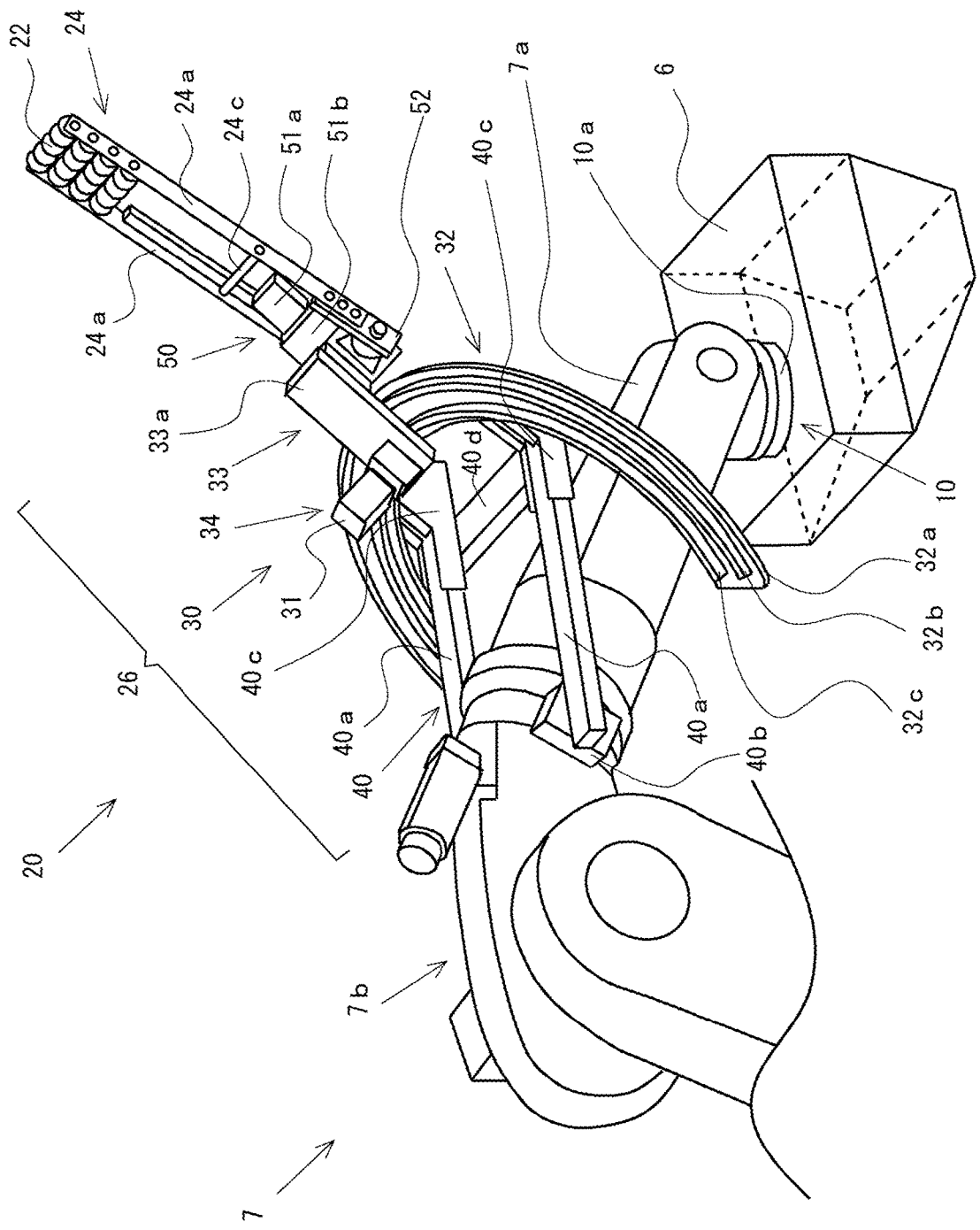
FIG. 2 is a perspective view illustrating the surrounding of a guide mechanism of the automated fiber bundle placement apparatus according to the invention.
Figure 3:
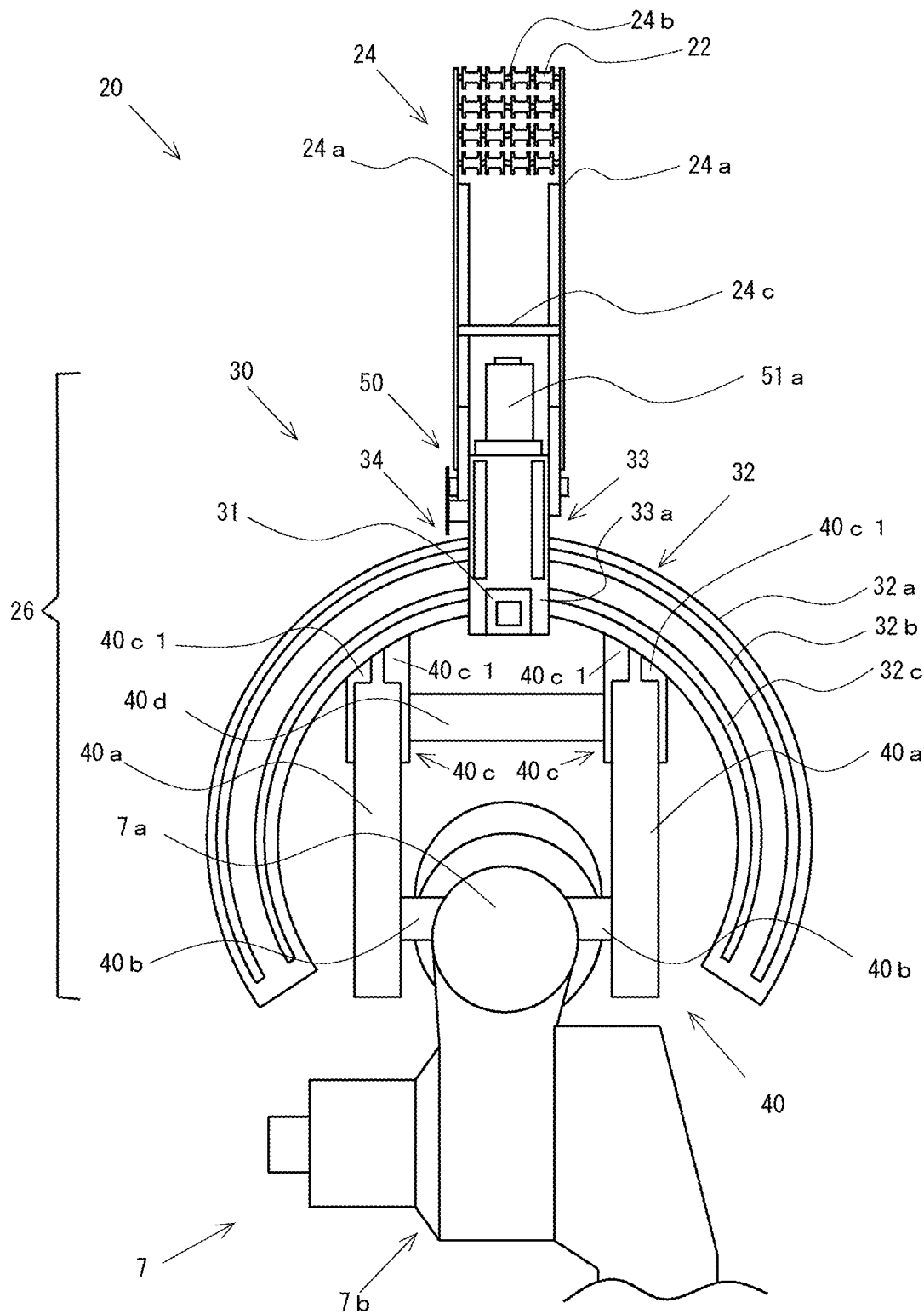
FIG. 3 is a plan of the guide mechanism illustrated in FIG. 1.
Figure 4:
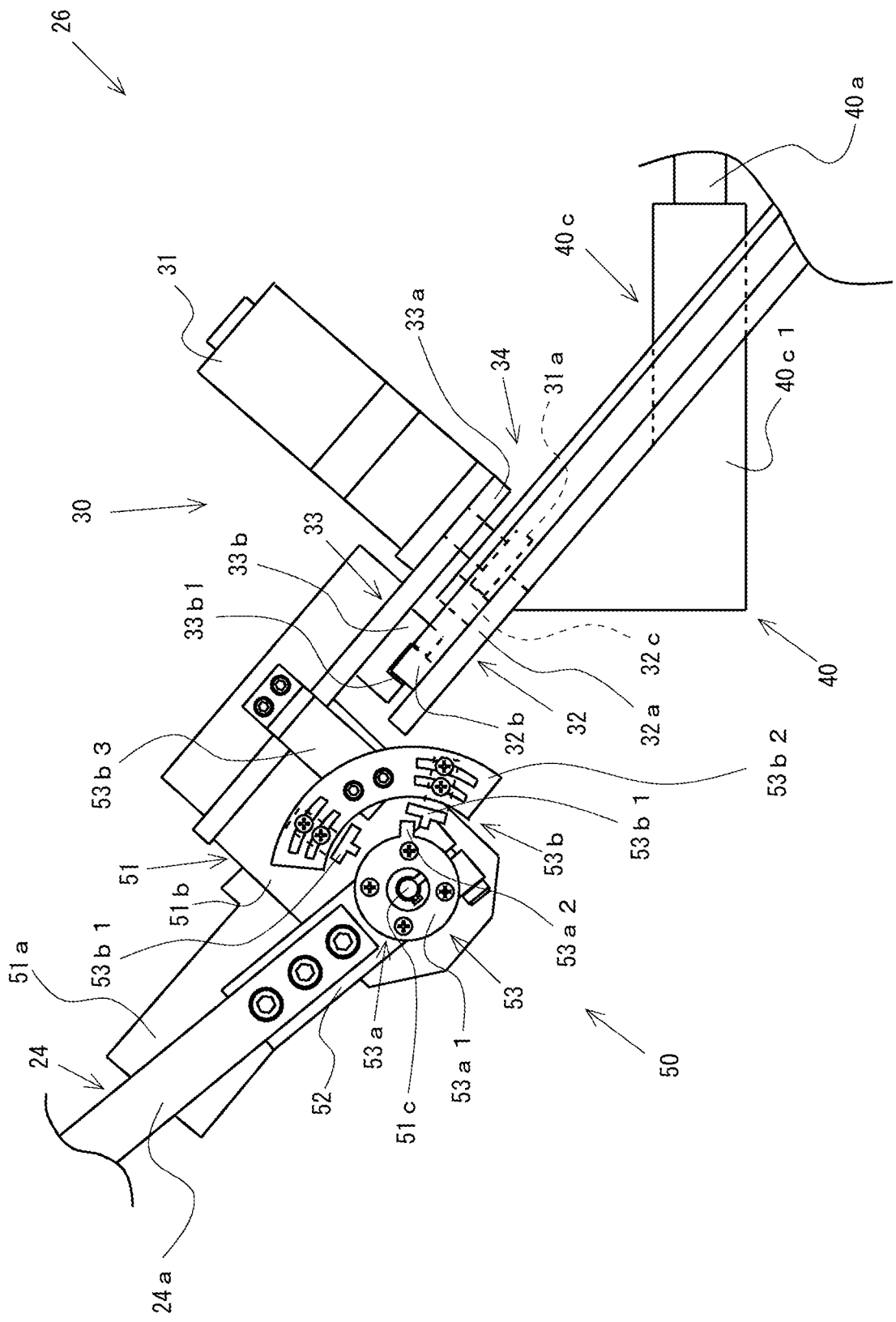
FIG. 4 is a side elevation of the guide mechanism illustrated in FIG. 1.

In a state of being supported by the arm 7a in this manner, the support member 24 makes an angle of approximately 70° toward the extremity side of the arm 7a with respect to the extending direction of the arm 7a when the arm 7a is viewed from the side, and is in a state of extending toward the extremity side of the arm 7a in a direction substantially along the front surface of the rail member 32 with respect to the rail member 32 supported by the arm 7a. The tow guides 22 provided in accordance with the number (sixteen in the embodiment) of fiber bundles 2 to directly guide the fiber bundles 2 are supported on the extremity side of the pair of side plates 24a and 24a of the support member 24 supported by the arm 7a in the above manner. Incidentally, in the embodiment, the position of the tow guide 22 supported in this manner is above the extremity of the arm 7a in a state where the movable member 33 is positioned at the center of the rail member 32 (base portion 32a) in the width direction as illustrated in FIGS. 1 and 2.

According to the automated fiber bundle placement apparatus 1 provided with the guide mechanism 20 (support mechanism 26) configured as described above, by operating the articulated robot 7 (arm 7a) according to a preset program, the placement of the plurality of fiber bundles 2 on the placement die 5 is performed. In the above-described placement, the rotation mechanism 10 (rotation section 10a) in which the placement head 6 is attached to the arm 7a is swingably driven in accordance with the shape on the placement die 5 on which the placement of the fiber bundle 2 is performed, and accordingly, there is also a case where the swing drive of the placement head 6 for making the placement head 6 swing around the axial line of the rotation section 10a is performed. When such a placement head 6 is driven to swing, the position of the introduction section 6a on the placement head 6 varies (changes) relative to the extremity of the arm 7a in the articulated robot 7.

In addition, as the placement head 6 is swingably driven in this manner, the driving motor 31 in the driving unit 34 is driven to displace the movable member 33 on the rail member 32 in the drive mechanism 30 in the support mechanism 26. When the driving motor 31 is driven, the pinion 31a attached to the output shaft is engaged with the rack 32c on the rail member 32, and accordingly, the support 33a and the engaging member 33b attached to the support 33a in the movable member 33 to which the driving motor 31 is attached are displaced in the arc direction of the rail member 32 along the guide rail 32b in a form of being guided to the guide rail 32b on the rail member 32 by the engaging member 33b. The drive (drive timing and the like) of the driving motor 31 is also preset in the program in accordance with the swing drive of the placement head 6. Therefore, the displacement drive of the movable member 33 is executed in accordance with the swing drive of the placement head 6.

When the movable member 33 is driven to be displaced in this manner, the support member 24 attached to the movable member 33 is displaced along the rail member 32 in accordance with the swing operation of the placement head 6. Since the rail member 32 is provided with respect to the arm 7a as described above, the displacement is performed such that the position of the support member 24 changes in the width direction. Accordingly, since it is possible to avoid interference of the fiber bundle 2 with the arm 7a or the like of the articulated robot 7 due to the swing operation of the placement head 6, the restriction on the operation of the placement head 6 can be reduced as much as possible.

Furthermore, the drive mechanism 30 in the guide mechanism 20 (support mechanism 26) includes the longitudinal oscillation mechanism 50 configured as described above, and the support member 24 is supported by the rail member 32 (movable member 33) via the longitudinal oscillation mechanism 50. The pair of oscillating arms 52 and 52 to which the support member 24 is attached in the longitudinal oscillation mechanism 50 are driven to oscillate by the driving motor 51a in the extending direction of the arm 7a. Therefore, as the pair of oscillating arms 52 and 52 are driven to oscillate, the support member 24 are driven to oscillate in the extending direction of the arm 7a around the position of the oscillation shaft 51c in the longitudinal oscillation mechanism 50.

Here, by driving the longitudinal oscillation mechanism 50 in accordance with the swing drive of the placement head 6, the position of the tow guide 22 supported by the support member 24 changes in the extending direction of the arm 7a in accordance with the change in the position of the introduction section 6a as described above. Accordingly, as described above, the position of the introduction section 6a with respect to the extremity of the arm 7a changes in accordance with the operation such as swing of the placement head 6, but the change in the path length of the fiber bundle 2 from the tow guide 22 to the introduction section 6a is reduced. Therefore, the adverse effect on the placement due to the change in the path length is suppressed as much as possible, and accordingly, the placement can be performed stably. Moreover, in the guide mechanism 20 of the embodiment, the longitudinal oscillation mechanism 50 is configured to actively drive the support member 24 to oscillate by the driving motor 51a, and accordingly, the displacement of each tow guide 22 in accordance with the swing operation of the placement head 6 is performed more reliably.

Incidentally, the longitudinal oscillation mechanism 50 of the embodiment includes an oscillation detection device 53 that detects that the oscillation of the support member 24 exceeds the allowable range. The oscillation detection device 53 is configured with a detected body 53a attached to the oscillating arm 52, and a detection mechanism 53b that detects the detected body 53a.

Regarding the oscillation detection device 53, more specifically, the detected body 53a is a member formed of a thin plate material and mainly in a shape of a disk. The detected body 53a has a protruding part (protrusion portion) 53a2 formed to extend in the radial direction from the outer peripheral edge of a main disc-shaped part (disk-shaped portion) 53a1. The protrusion portion 53a2 is a part detected by the detection mechanism 53b, and is a detected portion in the detected body 53a. The detected body 53a is attached to the part of the other end portion of the oscillating arm 52 by a plurality of screw members.

However, the attachment is performed at a position where the center of the disk-shaped portion 53a1 matches the axial center of the oscillation shaft 51c when viewed in the axial direction of the oscillation shaft 51c to which the oscillating arm 52 is attached. Therefore, as the oscillating arm 52 is driven to oscillate, the protrusion portion (detected portion) 53a2 of the detected body 53a oscillates only by the same oscillation amount of the oscillating arm 52 around the axial center of the oscillation shaft 51c, In the illustrated example, the attachment of the detected body 53a to the oscillating arm 52 is performed in a phase that the protrusion portion 53a2 faces the support 33a.

The detection mechanism 53b is configured with a pair of detectors 53b1 and 53b1 and an attachment mechanism for making both the detectors 53b1 and 53b1 in a state of being attached to the support 33a and supported. The attachment mechanism includes an attaching plate 53b2 to which both the detectors 53b1 and 53b1 are attached, and an attaching bracket 53b3 for attaching the attaching plate 53b2 to the support 33a, The pair of detectors 53b1 and 53b1 are attached to the attaching plate 53b2 supported by the support 33a by the attaching bracket 53b3 with the plurality of screw members, in the placement to face the outer peripheral surface of the disk-shaped portion 53a1 of the detected body 53a at a position on the support 33a side with respect to the detected body 53a.

Each detector 53b1 detects that the detected body 53a (detected portion 53a2) has reached the position of the detector 53b1, in the detecting section thereof. The placement of both the detectors 53b1 and 53b1 with respect to the detected body 53a is set at a position where the detecting section is positioned in each of the detectors 53b1 on the path of the oscillation of the detected portion 53a2 in accordance with the oscillation of the oscillating arm 52. Furthermore, the placement of both the detectors 53b1 and 53b1 is set at a position beyond the boundary position in the oscillating direction of the detected portion 53a2, with respect to the position (boundary position) of the detected portion 53a2 that corresponds to both oscillation limits in a preset allowable oscillation range (allowable range) for the oscillation of the oscillating arm 52.

The oscillation detection device 53 outputs the detection signal to the control device (not illustrated) in the automated fiber bundle placement apparatus 1 as the detector 53b1 in the detection mechanism 53b detects the detected body 53a (detected portion 53a2). Accordingly, for example, in a case where an irregularity occurs at the drive part or the like in the longitudinal oscillation mechanism 50 and the oscillating arm 52 (support member 24) oscillates beyond the above-described allowable range, the oscillation detection device 53 detects the oscillation and the detection signal is output to the control device. Therefore, since the control device grasps that the above-described irregularity has occurred by the detection signal, it is possible to cause the control device to perform appropriate processing (stop and the like) related to the control or the like of the articulated robot 7.

Above, one embodiment (hereinafter, referred to as "the embodiment") of the automated fiber bundle placement apparatus to which the present invention is applied has been described. However, the present invention is not limited to that described in the embodiment, and can also be implemented in another embodiment (modification example) as described below.

(1) Regarding the position changing mechanism for displacing the tow guide (support member), in the embodiment, the position changing mechanism includes the displacement mechanism for displacing the support member 24 using an actuator as a driving source. In other words, the position changing mechanism of the embodiment is configured to include the displacement mechanism that actively displaces the tow guide 22 (support member 24). In addition, in the embodiment, the displacement mechanism is the longitudinal oscillation mechanism 50 that is driven to oscillate the support member 24 in the extending direction of the arm 7a. However, in the invention, even in a case where the position changing mechanism includes the displacement mechanism as described above, the displacement mechanism is not limited to the one configured as in the embodiment, and a configuration in which the support member is displaced linearly in the extending direction of the arm may be employed.

For example, the displacement mechanism is configured such that the support member configured similar to the configuration in the embodiment is supported by a linear motion guide section configured such that the support member can be displaced in the longitudinal direction of the side plate thereof, with respect to the part (movable member 33 in the embodiment) supported by the arm 7a. In addition, the displacement mechanism may be configured to include a ball screw mechanism that displaces the support member supported to be displaceable in the longitudinal direction in this manner.

Specifically, a driving motor which is a driving source is fixed to the linear motion guide section with the output shaft oriented toward the support member in the longitudinal direction. The ball screw is attached to the output shaft of the driving motor, and the nut screwed to the ball screw is attached so as not to rotatable relative to the support member. According to the displacement mechanism configured in this manner, the driving motor is rotationally driven in the forward and reverse directions, and accordingly, the support member is displaced in the longitudinal direction in a form of being guided by the linear motion guide section, and the tow guide is displaced linearly.

In a case where the position changing mechanism is configured to linearly displace the tow guide, the position changing mechanism can also be configured to passively perform the displacement of the tow guide. For example, in the configuration in which the support member is supported by the linear motion guide section as described above, the position changing mechanism may be configured to include a spring member that elastically biases the support member toward the tow guide in the longitudinal direction between the linear motion guide section and the support member.

According to the position changing mechanism configured in this manner, the position of the introduction section is displaced in the swing direction in accordance with the swing operation of the placement head, and accordingly, each of the tow guides is in a form of being pulled by the fiber bundle guided by each of the tow guides respectively. Accordingly, the tow guide supported by the support member displaceable in the longitudinal direction is linearly displaced in accordance with the swing of the placement head. In this manner, the position changing mechanism in the invention is not limited to the one configured to include the displacement mechanism using the actuator as the driving source and actively displace the tow guide, and may be configured such that the displacement of the tow guide is passively performed.

(2) Regarding the guide mechanism including the position changing mechanism, in the embodiment, the guide mechanism 20 is configured such that the tow guide 22 (support member) can also be displaced in the width direction of the automated fiber bundle placement apparatus 1. As a configuration (width displacement mechanism) for realizing such displacement in the width direction, the guide mechanism 20 is configured to include the rail member 32 supported with respect to the arm 7a, the movable member 33 displaced in the width direction on the rail member 32, and the driving unit 34 for displacing the movable member 33 on the rail member 32, In addition, the position changing mechanism including the combination of the support member 24 and the displacement mechanism (longitudinal oscillation mechanism) is supported by the arm 7a via the width displacement mechanism, and is also displaced in the width direction.

However, the guide mechanism in the invention may be configured such that the tow guide is displaced in accordance with the swing of the placement head, and in the configuration including the position changing mechanism, the width displacement mechanism described above can be omitted. In a case where the guide mechanism does not include the width displacement mechanism in this manner, the support of the support member with respect to the arm may be performed, for example, in a form of attaching an appropriate bracket or the like to the arm and attaching the position changing mechanism to the bracket or the like.

(3) Regarding the head swing mechanism for changing the position of the introduction section, in the embodiment, the head swing mechanism is configured to include the rotation mechanism 10 interposed between the arm 7a and the placement head 6 and make the placement head 6 swingably driven around the axial line by the rotation mechanism 10. However, in the invention, the head swing mechanism is not limited to the one configured as in the embodiment.

For example, the head swing mechanism may be a mechanism configured to rotate the arm around the center axial line. In a case of this configuration, as the arm is rotationally driven, the placement head is oscillated and displaced around the center axial line, and the introduction section is displaced relative to the extremity of the arm. However, in a case of this configuration, in a case where the automated fiber bundle placement apparatus is configured such that the support member is supported by the arm as in the embodiment, it is necessary to configure the arm to include a part (fixed part) that is not rotationally driven as a part that supports the support member in addition to the part which is rotated as described above.

Furthermore, the head swing mechanism may be a mechanism interposed between the arm and the placement head and configured to oscillate and displace the placement head with respect to the arm. The head swing mechanism described above is not limited to being provided independently, and the head swing mechanism may be configured by combining two or more types of mechanisms.

The invention is not limited to the above-described embodiments, and various modifications can be made without departing from the gist of the invention.

What is claimed is:

1. An automated fiber bundle placement apparatus comprising:
   a supply device configured to set a plurality of bobbins around which fiber bundles are wound, and deliver the fiber bundles from each of the bobbins;
   a placement head that includes an introduction section for introducing each of the fiber bundles supplied from the supply device, and performs placement of each of the introduced fiber bundles on a placement die; and an articulated robot which has an arm to which the placement head is attached and moves the placement head for the placement, wherein the articulated robot includes a joint that rotates or oscillates the placement head in order to change a position of the introduction section with respect to an extremity of the arm, and a guide mechanism having a plurality of tow guides provided corresponding to each of the fiber bundles for guiding the fiber bundles from the supply device toward the placement head, wherein the guide mechanism includes a position changing mechanism which includes a support member for supporting the tow guides, and which displaces the tow guides in response to the change in the position of the introduction section, and wherein change of a path length of the fiber bundles, spanning from the tow guides to the introduction section, is suppressed by displacing the tow guides in response to the change of the position of the introduction section.

2. The automated fiber bundle placement apparatus according to claim 1, wherein the position changing mechanism includes a displacement mechanism that displaces at least a part of the support member that supports the tow guides by using an actuator as a driving source.

3. The automated fiber bundle placement apparatus according to claim 2, wherein the displacement mechanism is a longitudinal oscillation mechanism that oscillates the support member in an extending direction of the arm.

* * * * *